UNITED STATES PATENT OFFICE.

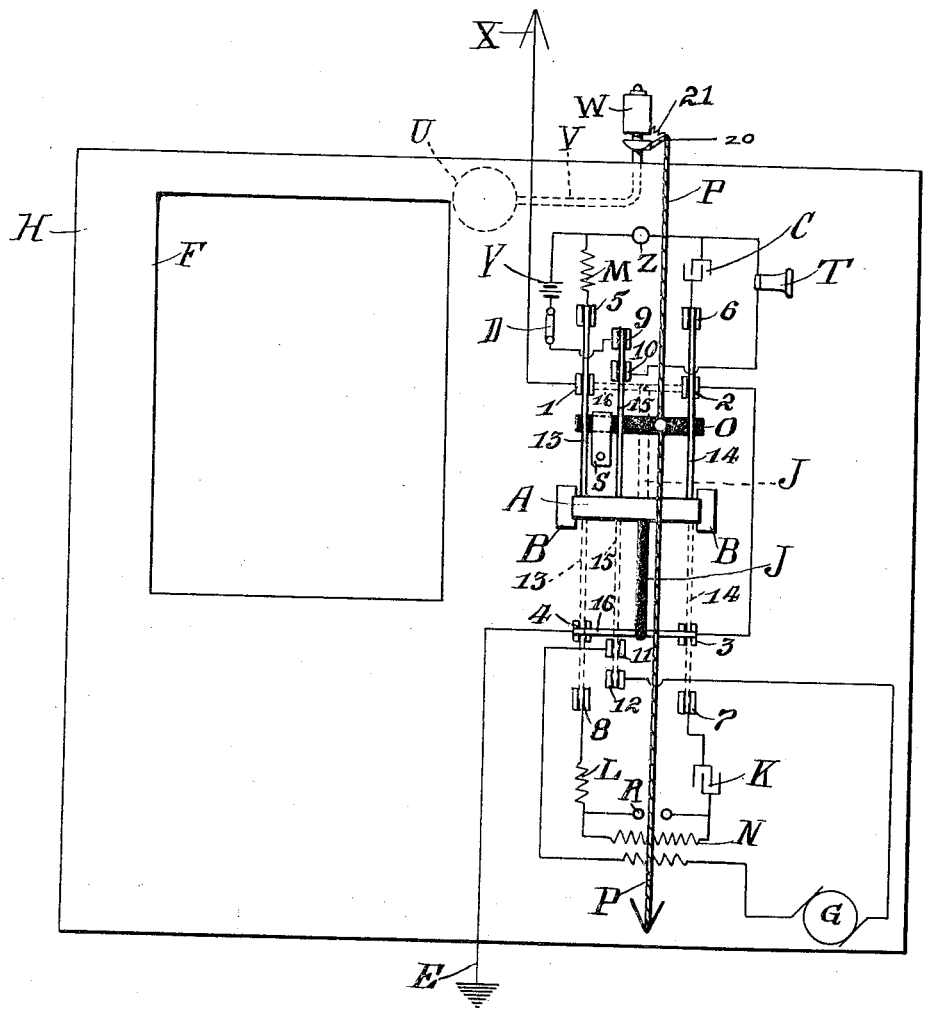

WARREN N. PHINNEY, OF BOSTON, MASSACHUSETTS.

COMPOSITE ELECTRIC SIGNALING SYSTEM.

1,138,013.  Specification of Letters Patent.  Patented May 4, 1915.

Application filed October 21, 1907. Serial No. 398,338.

*To all whom it may concern:*

Be it known that I, WARREN N. PHINNEY, a citizen of the United States of America, and a resident of the city of Allston, Boston, Massachusetts, have invented certain new and useful Improvements in Composite Electric Signaling Systems, the principles of which are set forth in the following specification and accompanying drawings, which disclose the form of the invention which I now consider to be the best of the various forms in which the principles of the invention may be embodied.

This invention relates to signaling systems, particularly for use in warning ships of imminent danger.

The object of the invention is to provide such a system as shall be operative between a ship and an invisible danger point, such as another ship or a shoal or rock, which may have visual signals thereon, but which are obscured by fog, storm or darkness.

A further object of the invention is to provide such a system as will be operative between a ship and a danger point, when the distance between them is so comparatively slight that further progress may be extremely dangerous, such distances being those measured by the audibilitiy of the ordinary steam-fog-horn or siren which are capable of producing sound-waves transmissible to a considerable distance. Such sound-signals, while conveying more or less accurate intelligence as to the direction of their source of emanation, are extremely deceptive and misleading with respect to the conveyance of an idea as to the distance of the place of reception of the sound from the place of its production.

An object of the invention, therefore, is to provide a system which will furnish intelligence as to the distance as well as the direction of the place of danger constituting the transmitter of the system, thereby not only warning the pilot to take instant action in case of immediate danger, but also permitting him to proceed forward without fear and without losing time or steerage way in case of absence of danger.

The invention involves, fundamentally, the well-known enormous difference in time-transmission between electromagnetic or so-called electric waves, and sound waves.

The drawing is a diagrammatic illustration of an embodiment of the invention, which, as to physical embodiment, is extremely simple and therefore practicable and useful in operation.

H may represent a ship's pilot house or a portion of a light house, in which the apparatus is installed; and F a window-opening for the look-out. Any suitable wireless telegraphy apparatus may be installed in the pilot house, and supplied with electrical energy for transmission of signals by any suitable generator G, which, as the required distances of transmission are only a few miles, may be of extremely low power, such as of a battery of a few cells furnished with the usual interrupter with the transformer or induction coil N. In receiving signals the pilot may use the telephone T, which may be adapted to be applied to only one ear, leaving the other ear uncovered to listen to the sound of a distant whistle.

Each intercommunicating system is to be provided with apparatus similar to that shown, and consisting of both transmitting and receiving means for electric waves, and also a steam fog-horn or siren or other adequate sound-producing means.

The electric wave transmitting means may comprise, in addition to generator G and transformer N, the inductance L, condensance (*i. e.*, capacity) K and spark-gap R, all connected together and to the switch points 7 and 8 so as to be included within the main or aerial circuit X—E, which may be any desired form of known circuit for the purpose.

An oscillating switch-member A is pivoted in bearings B, B, and carries a part J, to the end of which is secured a conducting bar 16 supported on switch-member J and connecting switch-points 3 and 4 together to connect the upper part X of the aerial circuit with the lower part E, such as earth. Normally the connection is such as to operatively include the receiving apparatus with the aerial circuit X—E, the transmitting apparatus being normally cut out from cooperation with the aerial circuit, as shown.

When it is desired to employ the installation to transmit signals, the rope or string P, attached to switch-member O, is pulled downward to bring the switch blades 13 and 14 into the position shown in dotted lines, and to simultaneously oscillate the conductor 16 from the position shown in full lines. The result is to disconnect switch-points 3 and 4 from each other and to connect them respectively to points 7 and 8 thereby connecting to the aerial circuit, the apparatus included in the oscillation circuit K, R, L. The switch-member A carries also a conducting blade 15, and when the rope P is pulled downward, this is moved into its dotted line position to connect switch-points 11 and 12 together, thus closing the circuit of generator G through the primary of induction coil N and causing the production of high frequency oscillations which result in the radiation of electric waves from antenna X—E. The switch blades 13, 14 and 15 oscillate above the plane of the drawing, while conducting bar 16 oscillates below the plane.

The rope P is also connected, in any usual way, to the fog-horn, siren, or whistle W, of any known construction, so that when the rope is pulled the propagation of sound waves by the fog-horn commences, simultaneously with the radiation of electric waves from antenna X—E. When the power whistle is operated by steam, the supply may be through the pipe V from a boiler U which may be located at any suitable place and used also either to supply the vessel-propelling means or power apparatus for stevedore use, etc. Other forms of power may be employed to operate the whistle, and the rope P may be attached so that when it is pulled the power operates the whistle, the power being automatically shut off when rope P is released. In the example shown, the rope is so connected that when it is pulled it depresses the lever 20 to open a steam valve in the usual way, and also puts spring 21 under tension so that the steam supply is cut off as soon as rope P is released.

Let the drawings now represent an installation on another ship within audible distance from the siren or whistle of the first, the two vessels and their signal lights being invisible, the one to the other, by reason of fog, storm or darkness. Under these circumstances pilot number 2 will have the telephone T at his ear. The suitable spring S, bearing on the switch-member O, keeps the switch in its normal position to maintain the wireless receiving apparatus in operative condition, as shown by the switch-blades 13, 14 and 15 in full lines. Thus the switch-points 1 and 2 are disconnected (as indicated by the dotted line joining them), the switch conductor 16 being in its normal position to connect switch-points 3 and 4 together to maintain the continuity of the earthed circuit X—E. Also switch blade 13 connects points 1 and 5 together and blade 14 connects points 2 and 6 together; thus connecting to the antenna circuit, the oscillation receiving circuit including condenser C, detector Z and inductance M. The switch blade 15 connects points 9 and 10 together also, so that the circuit is closed through the detector Z, battery Y and telephone T. The small switch D in the battery circuit, (which may be opened in clear weather or when the pilot is not using the system at all) is also closed, so that the receiving apparatus is in operative condition.

Pilot number 2 will therefore not only hear, with his uncovered ear, the sound of the siren on the first boat, but also, with the ear to which telephone T is applied, the signal corresponding to the electrical disturbance on the first ship. And this latter sound will be loud, since the two boats are at most but a few miles or less apart.

If the perception by pilot number 2 of the sound of the whistle, immediately follows the telephone click he will know that immediate action is necessary, even if the sound of the whistle is faint or indistinct; because the close occurrence of the two sounds means that the two boats are dangerously close together, as indicated by the fact that the time required for the transmission of the sound-waves is practically but little longer than that required for transmission of the electric waves. Pilot number 2 will also pull his own compound signaling rope to impart similar intelligence to pilot number 1; and as soon as pilot number 2 lets go of the rope, the switching mechanism will automatically replace his apparatus in condition for receiving. Meanwhile, pilot number 1 has been alternately pulling his signaling rope, and listening for the time intervals between the two signals made by pilot number 2. In this way both pilots will be certainly apprised of immediate danger, which would be impossible with a whistle alone, or with wireless telegraphy alone; and without both operating simultaneously. The rope P, may, particularly on light-house installations, be replaced by any other suitable operating means, such as the automatic or other clockwork arrangements heretofore in use for operating whistles and sirens on ships and light-houses.

On the other hand, if the sound of the whistle is very loud and clear, the boats might be a safe distance of several miles apart, such as not to necessarily cause alarm, delay or loss of steerage-way. In the absence however, of the coöperation of the electric waves with the electric waves, the pilot could not know this; but if the loud sound of the whistle is heard by him only upon the lapse of a considerable time interval after the telephone click, he is thereby informed of that, to him, interesting fact that the other vessel is at a safely remote distance. Furthermore he has a continual feeling of assurance, in that he and the other pilot may each alternately send and listen, until the time interval very greatly increases between the perception of the telephone click and the whistle sound, respectively, in cases where it does not decrease to such an extent as to necessitate quick action on the part of both pilots in managing their boats.

The whistle W may be replaced by any suitable equivalent, such as a bell, or a gun or other explosion means. And the sound-waves may be propagated through water instead of air, as in the case of the submarine bell signaling system, wherein the sound is telephonically received on shipboard. The submarine sound-transmitting bell may not only be located at a station, but may be carried as a part of the ship installation. In such cases the telephone receiver of the submarine bell system will, in accordance with this invention, be applied to the ear of the pilot to which telephone T is not applied.

Obviously, and particularly in the case of installations at light-houses or light-ships, certain installations employing this invention may transmit a characteristic signal, so as to inform the pilot or pilot number 2 of his proximity to a definite locality.

While the invention is useful as applied to ocean-going vessels, it is particularly adapted to decrease danger in connection with light-houses, light-ships, and coasting vessels, including tugs and small steamers which frequent rivers, harbors and the coast generally. The practicability of wireless telegraphy now being assured, the invention is obviously practical, and its utility is also apparent.

I claim:

1. Apparatus for a signaling installation which comprises means for transmitting electric waves; in combination with means for observing the receipt of such waves from a distant transmitter; of a switch for causing said transmitting and receiving means to be alternately operative and inoperative; means for causing said switch to normally maintain the receiving means operative; means for producing sound waves transmissible to a considerable distance; and means for independently but simultaneously operating said sound-producing means and the switch to cause the electric wave transmitting means to become operative.

2. Apparatus for a signaling installation, which comprises means for transmitting electric waves; in combination with means for observing the receipt of such waves from a distant transmitter; of a switch for alternately operating such transmitting and receiving means; a spring which normally closes the switch with the receiving means; a power whistle; and means for independently but simultaneously operating said whistle and closing the switch to operate the electric transmitting means.

3. In apparatus for a composite signaling installation, the combination with means for transmitting and intelligibly receiving electric waves; of means for producing sound-waves transmissible to a considerable distance; means for placing alternately in operative condition, the means for transmitting and the means for receiving the electric waves; and means for operating the sound-producing means independently of but simultaneously with the electric wave transmitting means.

4. Apparatus for a signaling installation which comprises means for transmitting electric waves; in combination with means for observing the receipt of such waves from a distant transmitter; an aerial system constituting a part common to said transmitting and receiving means; of a switch for alternately operatively connecting one of said means with the aerial system and simultaneously removing the other means from such connection while maintaining an operative circuit through the aerial system; means for producing sound waves transmissible to a considerable distance; and means for independently but simultaneously operating said switch and said sound-producing means.

5. In a composite signaling installation, the combination with a transmitter of electric waves, of means for observing the receipt of such waves from a distant electric wave transmitter, means, operatively independent of said observing means, for producing sound waves transmissible to a considerable distance; and means alternately placing in operative condition, the electric wave transmitter and the means for observing the receipt of the electric waves.

6. In a composite signaling installation, the combination with means for transmitting and means for intelligibly receiving electric waves; of means, operatively independent of said receiving means, for producing sound-waves transmissible to a considerable distance; means for rendering the receiving means inoperative during the operation of the sound-producing means, and means for operating said electric wave transmitting means and said sound-producing means substantially simultaneously.

7. In a composite signaling installation, the combination with means for transmitting and means for intelligibly receiving electric waves; of means for alternately placing in operative condition, the means for transmitting and the means for receiving electric waves; means, operatively independent of said receiving means, for producing sound-waves transmissible to a considerable distance; and means for operating the sound-producing means and the electric wave transmitting means substantially simultaneously.

WARREN N. PHINNEY.

Witnesses:
  PHILIP FARNSWORTH,
  M. D. HART.